J. W. BRAGSTAD.
BLOCK MOLDING MACHINE.
APPLICATION FILED DEC. 3, 1909.
959,050.
Patented May 24, 1910.
2 SHEETS—SHEET 2.
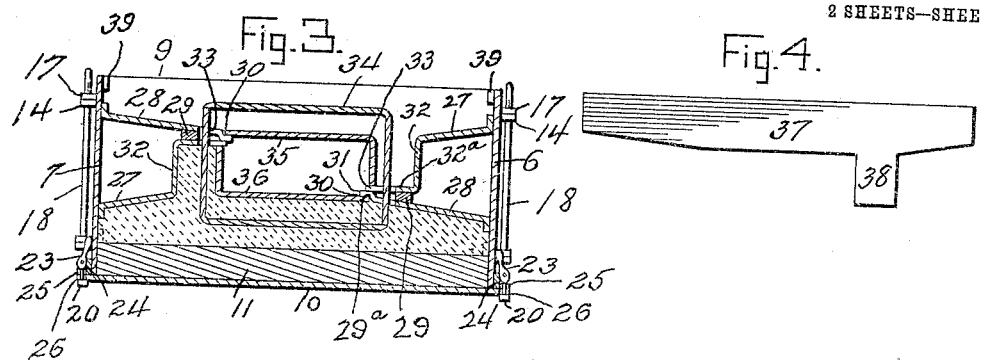
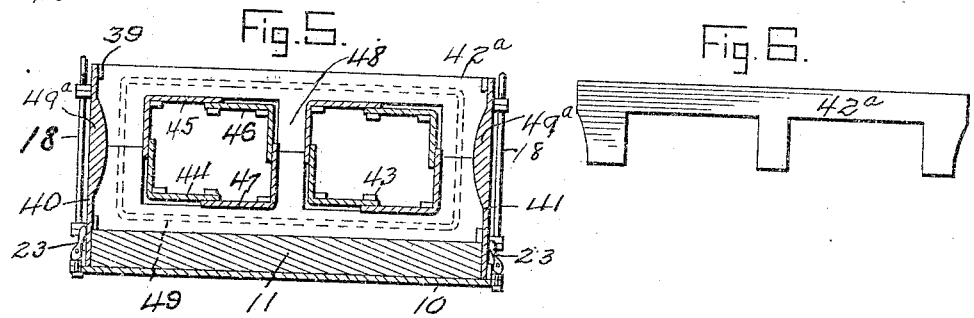
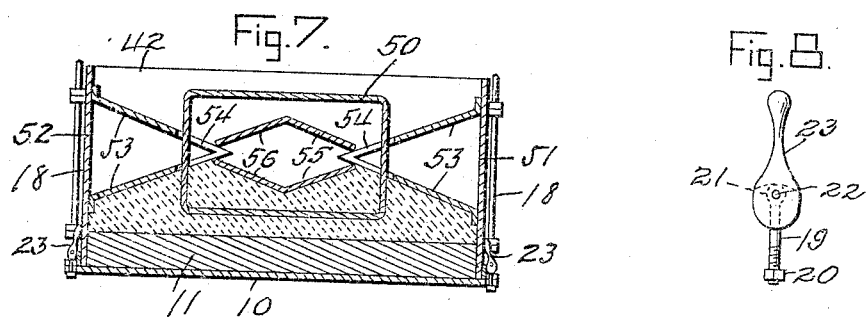
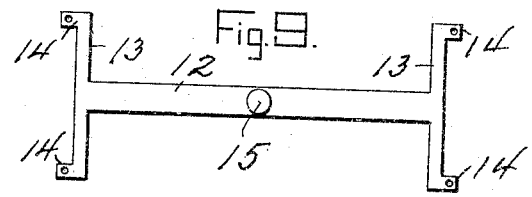
Witnesses
C. K. Reichenbach
N. Louis Boyden
Inventor
Joseph W. Bragstad
By H. Everett
Attorneys

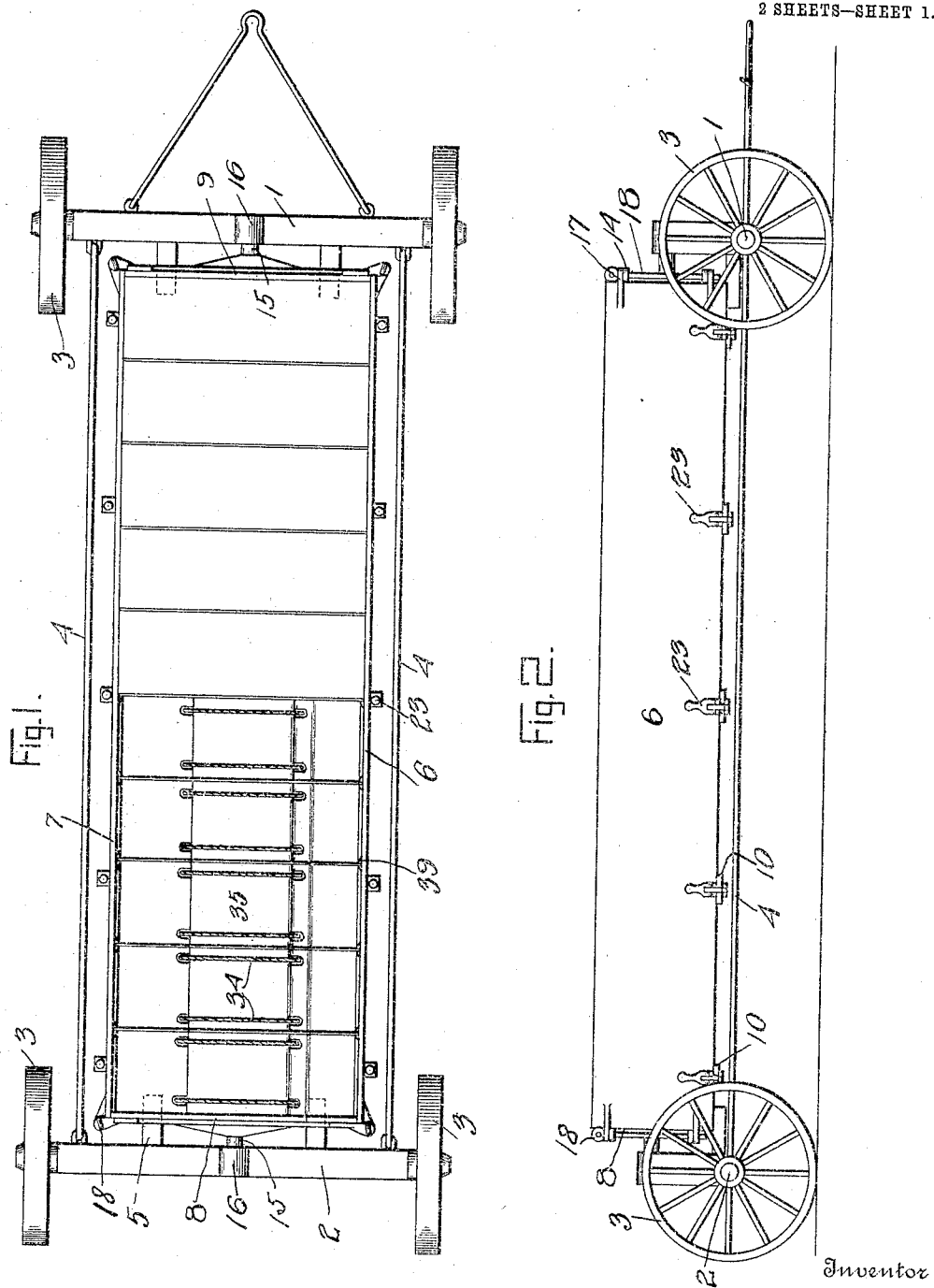

UNITED STATES PATENT OFFICE.

JOSEPH W. BRAGSTAD, OF CANTON, SOUTH DAKOTA, ASSIGNOR TO THE BRAGSTAD BROS. CO., INC., OF CANTON, SOUTH DAKOTA, A CORPORATION OF SOUTH DAKOTA.

BLOCK-MOLDING MACHINE.

959,050.  Specification of Letters Patent.  Patented May 24, 1910.

Application filed December 3, 1909. Serial No. 531,268.

*To all whom it may concern:*

Be it known that I, JOSEPH W. BRAGSTAD, a citizen of the United States of America, residing at Canton, in the county of Lincoln and State of South Dakota, have invented certain new and useful Improvements in Block-Molding Machines, of which the following is a specification, reference being had therein to the accompanying drawing.

This invention relates to block molding machines and the object thereof is to provide a machine of such class in a manner as hereinafter set forth and claimed for molding a plurality of separate blocks of the same or of different contour simultaneously.

A further object of the invention is to provide a machine of such class which is portable so that it can be readily transported from place to place when occasion so requires.

A further object of the invention is to provide a machine of such class in a manner as hereinafter set forth and claimed which is particularly adapted for molding a plurality of blocks each formed of two sections and coupled together by anchoring means.

A further object of the invention is to provide a block molding machine in a manner as hereinafter set forth and claimed, by which a block can be manufactured out of slush concrete, that is, making a water-proof block.

A further object of the invention is to provide a block molding machine in a manner as hereinafter set forth and claimed, which will enable the block to be faced radially and equally and which allows of the operator conveniently ornamenting the outer face of the block if occasion so requires.

Further objects of the invention are to provide a portable block molding machine which shall be comparatively simple in its construction, strong, durable, efficient in its use, simultaneously molding a plurality of blocks, conveniently manipulated, and comparatively inexpensive to manufacture.

With the foregoing and other objects in view the invention consists in the novel construction, combination and arrangement of parts as hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings, wherein like reference characters denote corresponding parts throughout the several views, Figure 1 is a plan of a block molding machine in accordance with this invention, showing a portion of the machine filled with the material from which the blocks are formed and the remaining portion empty, Fig. 2 is a side elevation of the machine, Fig. 3 is a cross sectional view of the machine with the lower portion thereof containing material for forming one half of the block, the upper portion of the machine being empty, Fig. 4 is a detail illustrating the form of partition plate used in connection with the construction shown in Fig. 3, Fig. 5 is a view similar to Fig. 3, Fig. 6 is a view of the partition plate used in connection with the construction shown in Fig. 5, Fig. 7 is a view similar to Fig. 3 of a modification, Fig. 8 is a detail illustrating one of the locking devices for adjustably connecting the removable bottom to the body-portion of the machine, and, Fig. 9 is a detail illustrating the form of supporting bracket carried by each end plate of the body-portion.

Referring to the drawings in detail, 1 denotes a front axle, and 2 a rear axle, and which are provided with wheels 3 and connected together by reach bars 4. Each of the axles is provided with a pair of inwardly-extending shiftable supports 5 which are capable of being elevated to the position shown in Fig. 1 so as to support the body-portion and which can also be lowered to enable the body-portion to be rotated upon the axles 1, 2, when occasion so requires.

The body-portion of the machine which also may be termed the mold consists of the side plates 6, 7, end plates 8, 9, removable straps 10, and a removable bottom 11. The bottom 11 is mounted upon the straps 10 when occasion so requires. Secured to each of the end plates of the body portion, that is, to the outer face of each of said end plates, is a supporting bracket which consists of a transversely - extending arm 12 terminating at each end in a vertically-disposed arm 13, the latter having at its upper end and at its lower end an outwardly-extending apertured lug 14. The arm 12 approximately centrally thereof is provided with a right-angularly disposed trunnion 15. The trunnions 15 extend in the bearings 16 carried by the axles 1, 2, and rotatably support the body-portion of the machine. Each of the side plates 6, 7, at each end thereof is provided with a pair of outwardly-extending apertured lugs 17 which register with the apertured lugs 14, and extending through said registering lugs are vertically-disposed coupling elements 18 for connecting the side and end plates of the body-portion together.

The bottom 11 is adjustably secured in position within the side and end plates by the straps 10 and a series of coupling devices each of which consists of a bolt 19 threaded at its lower end, carrying a nut 20 and at its upper end formed with an eye 21 through which extends a pivot 22, carrying a cam lever 23, the latter straddling the upper portion of the bolt 19. To each of the side plates at their lower ends is secured a series of angle irons 24 and which are slitted as at 25. The straps 10 are arranged against the angle irons 24 and are of such length as to project from the side plates of the body-portion and have each end formed with a slit 26 which registers with a slit 25 in an angle iron 24. The bolts 19 are adapted to be positioned in the registering slits and when the cam levers 23 are shifted in one direction the straps are connected to the angle irons whereby the bottom 11 is not only secured in position but also supported when the body-portion of the mold is in the position as shown in Figs. 3, 5 and 7. The means for connecting the sides and ends of the body portion together as well as the means for coupling the straps 10 in position is of like construction in Figs. 3, 5 and 7, the same reference characters being used throughout the figures just referred to.

Referring to Fig. 3, the side plate 6 as well as the side plate 7 is provided with what may be termed an inwardly-extending outer core of a length equal to the length of its respective side plate, the core which projects from the side plate 6 being oppositely-disposed with respect to the core which projects from the side plate 7. Each outer core is formed of three sections 27, 28 and 29. The section 28 inclines and has its inner end off-set as at 29ª to provide a seat 30 for a purpose to be presently referred to. The off-set end of the section 28 is slotted as at 31. The section 27 is formed of a pair of transversely-extending portions arranged in different planes and connected together by a vertically-extending portion 32. That transversely-extending portion of the section 27 which is indicated by the reference character 32ª is flat, while the other inclines and the portion 32ª is of less length than the other transversely-extending portion of said section 27 and is slotted as at 33, the slot 33 opposing the slot 31. The section 27 opposes the section 28 and the transversely-extending portion 32 of the section 27 is spaced from the section 28 by the section 29 which consists preferably of a wooden block, but it is evident that such spacing member can be formed by any suitable material. The sections 29 also constitute abutments as well as guides for continuous anchors 34 which are rectangular in contour and extend down through the registering slots of the outer cores as clearly shown in Fig. 3. The machine further comprises an inner core which is formed of two L-shaped sections 35 and 36 and of a length equal to the length of the mold, said sections being oppositely-disposed with respect to each other and the said sections 35 and 36 are mounted upon the off-set portions 29ª and the transversely-extending portions 32ª of the sections 27 as clearly shown in Fig. 3. The anchors 34 are positioned prior to the placing of the sections of the inner core in position.

Each block is separated by pairs of partitions and each partition consists of a flat bar 37 provided at a point near one end with a right-angular flat projection 38. Each of these partitions conform in shape to a section of a block. For maintaining the partitions in position the inner face of each of the side plates of the body portion is formed with a pair of spaced guides 39 between which the bars 37 extend; when a pair of partitions are placed between the blocks the projection of one partition engages the transverse portion 32. The partitions in connection with the end plates of the body portion constitute means for molding the sides of the blocks.

The construction as illustrated in Fig. 3 is used for molding a plurality of sectional blocks, with the sections coupled together by reinforcing anchors 34, two anchors being employed for coupling the sections of each block together, and each section consists of a body-portion provided with an extension, the anchors being mounted in the extensions and the body-portion. The sections of the block when molded are spaced from each other. This is evident owing to the manner in which the outer and inner cores are arranged. The inner cores are so disposed with respect to the side plates of the body portion that the space within the body portion above said cores will be of less height than the space below the cores. This arrangement is had in view of the fact that the bottom 11 is positioned between the side and end plates of the mold. The bottom 11 is of a length equal to the length of the body-portion and is adjustable whereby the body-portion of the lower section of the block can be made of varying thickness. The outer cores are fixedly secured to the inner face of the side plates of the body-portion.

When using the construction shown in Fig. 3, the body-portion is inverted, that is to say, it is oppositely-disposed with respect to the position shown in Fig. 3, the partition plates and anchors being mounted in position, the material is supplied to the body-portion and after a sufficient quantity has been placed therein, the bottom 11 is mounted between the sides and end plates and the straps 10 connected by the coupling devices to the side plates. The body-portion is then given a half turn which brings the empty portion thereof to the top, the material is then supplied to the emptied part of the body-portion and after the necessary quantity is supplied it is troweled and faced off as desired. Prior to the placing of the material in the empty part of the body-portion the other partition plates are mounted in position.

The construction as shown in Fig. 5, is designed for molding blocks of one piece and referring to said figures the side plates of the body-portion are indicated by the reference characters 40 and 41, and the end plates by the reference character 42. The side plates 40 and 41 are provided with spaced guides 39 for the partitions 42ª. Each end plate of the body-portion is formed with laterally-extending studs 43 for supporting the sections of the inner cores. Each inner core of the set shown in Fig. 5 is formed of four sections 44, 45, 46 and 47, each of said sections being angle-shaped in cross-section. The sections 44 and 46 are mounted against a pair of lugs 43 and the sections 45 and 47 are mounted upon one lug and overlap the ends of the sections 44 and 46. The inner cores of each set are spaced from each other as at 48, and are furthermore surrounded by the anchors 49 which constitute reinforcing mediums for the blocks. Each side plate of the body-portion is formed with an outer core 49ª which is curvilinear in contour. The partitions are indicated by 47ª.

The construction shown in Fig. 7 is designed for forming sectional blocks connected together by reinforcing anchors 50. In Fig. 7 the side plates of the body-portion are indicated by the reference characters 51, 52, and each is provided with an inwardly-extending V-shaped outer core 53 slotted as at 54 for the passage of the anchors. The inner core is formed of two sections 55, 56 which are oppositely-disposed with respect to each other and angle-shaped in cross-section and are of such width as to engage the inner ends of the outer cores 53.

What I claim is:

1. A block molding machine for manufacturing simultaneously a plurality of sectional blocks, comprising a rotatable body-portion provided with a removable bottom, an outer core secured to and projecting from the inner face of each of the sides of the body-portion, means to constitute a longitudinally-extending removable inner core arranged between the outer cores, upper and lower transversely-extending partitions seated upon the outer and inner cores, and means carried by the sides of the body-portion for maintaining said partitions in position.

2. A block molding machine for manufacturing simultaneously a plurality of sectional blocks, comprising a rotatable body-portion provided with a removable bottom, an outer core secured to and projecting from the inner face of each of the sides of the body-portion, means to constitute a longitudinally-extending removable inner core arranged between the outer cores, upper and lower transversely-extending partitions seated upon the outer and inner cores, means carried by the sides of the body-portion for maintaining said partitions in position, said outer cores alternately-disposed with respect to each other and each having its inner end cut-away to provide a passage for anchoring means.

3. A block molding machine for manufacturing simultaneously a plurality of sectional blocks, comprising a body-portion formed with side and end walls and a removable bottom, coupling devices embodying cam levers for adjustably connecting the bottom to the sides of the body-portion, a longitudinally-extending outer core projecting inwardly from the inner face of each of the side walls of the body-portion, longitudinally-extending means constituting a removable inner core arranged between the said outer cores, upper and lower transversely-extending partitions mounted upon both sides of said cores, and means carried by the sides of the body-portion for maintaining said partitions in position.

4. A block molding machine for manufacturing simultaneously a plurality of sectional blocks, comprising a body-portion formed with side and end walls and a removable bottom, coupling devices embodying cam levers for adjustably connecting the bottom to the sides of the body-portion, a longitudinally-extending outer core projecting inwardly from the inner face of each of the side walls of the body-portion, longitudinally-extending means constituting a removable inner core arranged between the said outer cores, upper and lower transversely-extending partitions mounted upon both sides of said cores, and means carried by the sides of the body-portion for maintaining said partitions in position, said outer cores being alternately-disposed with respect to each other and each having its inner end cut-away to provide for the passage of anchoring means.

5. A block molding machine for manufacturing a plurality of sectional blocks simultaneously, comprising a body-portion provided with side and end walls and a removable bottom, an inwardly-extending outer core projecting from the inner face of each of the sides of the body-portion, said cores alternately-disposed with respect to each other, a longitudinally-extending sectional and removable inner core having one of its sections mounted upon one face of the outer core and the other of its sections abutting against the other face of the outer core, and means for detachably connecting the bottom of the body-portion in position.

6. A block molding machine for manufacturing a plurality of sectional blocks simultaneously, comprising a body-portion provided with side and end walls and a removable bottom, an inwardly-extending outer core projecting from the inner face of each of the sides of the body-portion, said cores alternately-disposed with respect to each other, a longitudinally-extending sectional and removable inner core having one of its sections mounted upon one face of the outer core and the other of its sections abutting against the other face of the outer core, means for detachably-connecting the bottom of the body-portion in position, transversely-extending partitions mounted against the upper and lower faces of said cores, and means for maintaining said partitions vertical.

7. A block molding machine for manufacturing a plurality of sectional blocks simultaneously, comprising a body-portion provided with side and end walls and a removable bottom, an inwardly-extending outer core projecting from the inner face of each of the sides of the body-portion, said cores alternately-disposed with respect to each other, a longitudinally-extending sectional and removable inner core having one of its sections mounted upon one face of the outer core and the other of its sections abutting against the other face of the outer core, means for detachably-connecting the bottom of the said body-portion in position, transversely-extending partitions mounted against the upper and lower faces of said cores, and means for maintaining said partitions vertical, each of said outer cores in proximity to the sides of the inner core slotted to provide for the passage of anchoring means.

8. A block molding machine for manufacturing a plurality of sectional blocks simultaneously, comprising a body-portion provided with side and end walls and a removable bottom, an inwardly-extending outer core projecting from the inner face of each of the sides of the body-portion, said cores alternately-disposed with respect to each other, a longitudinally-extending sectional and removable inner core having one of its sections mounted upon one face of the outer core and the other of its sections abutting against the other face of the outer core, means for detachably-connecting the bottom of the said body-portion in position, transversely-extending partitions mounted against the upper and lower faces of said cores, means for maintaining said partitions vertical, each of said outer cores in proximity to the sides of the inner core slotted to provide for the passage of anchoring means, and a rotatable supporting means for and connected to each end of the body-portion.

In testimony whereof I affix my signature in the presence of two witnesses.

JOSEPH W. BRAGSTAD.

Witnesses:
   CHAS. STUBBERND,
   D. N. JOHNSON.